July 10, 1956    A. A. TUNLEY    2,753,817
BISCUIT CUTTING MACHINES AND THE LIKE
Filed Jan. 12, 1953    5 Sheets-Sheet 1
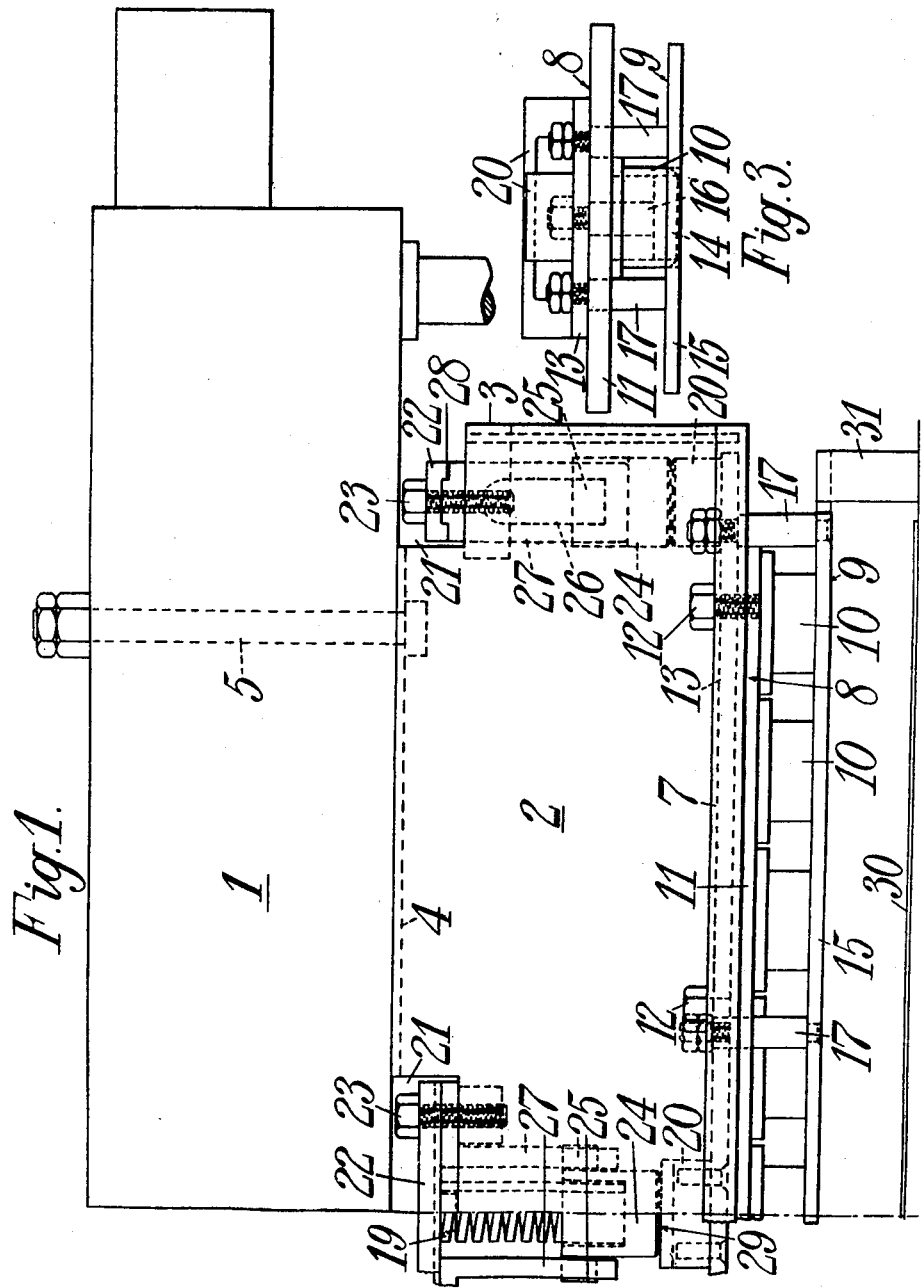
Inventor
Allen Ashmead Tunley.
By Fearman & Fearman
Attorneys.

July 10, 1956 — A. A. TUNLEY — 2,753,817
BISCUIT CUTTING MACHINES AND THE LIKE
Filed Jan. 12, 1953 — 5 Sheets-Sheet 2
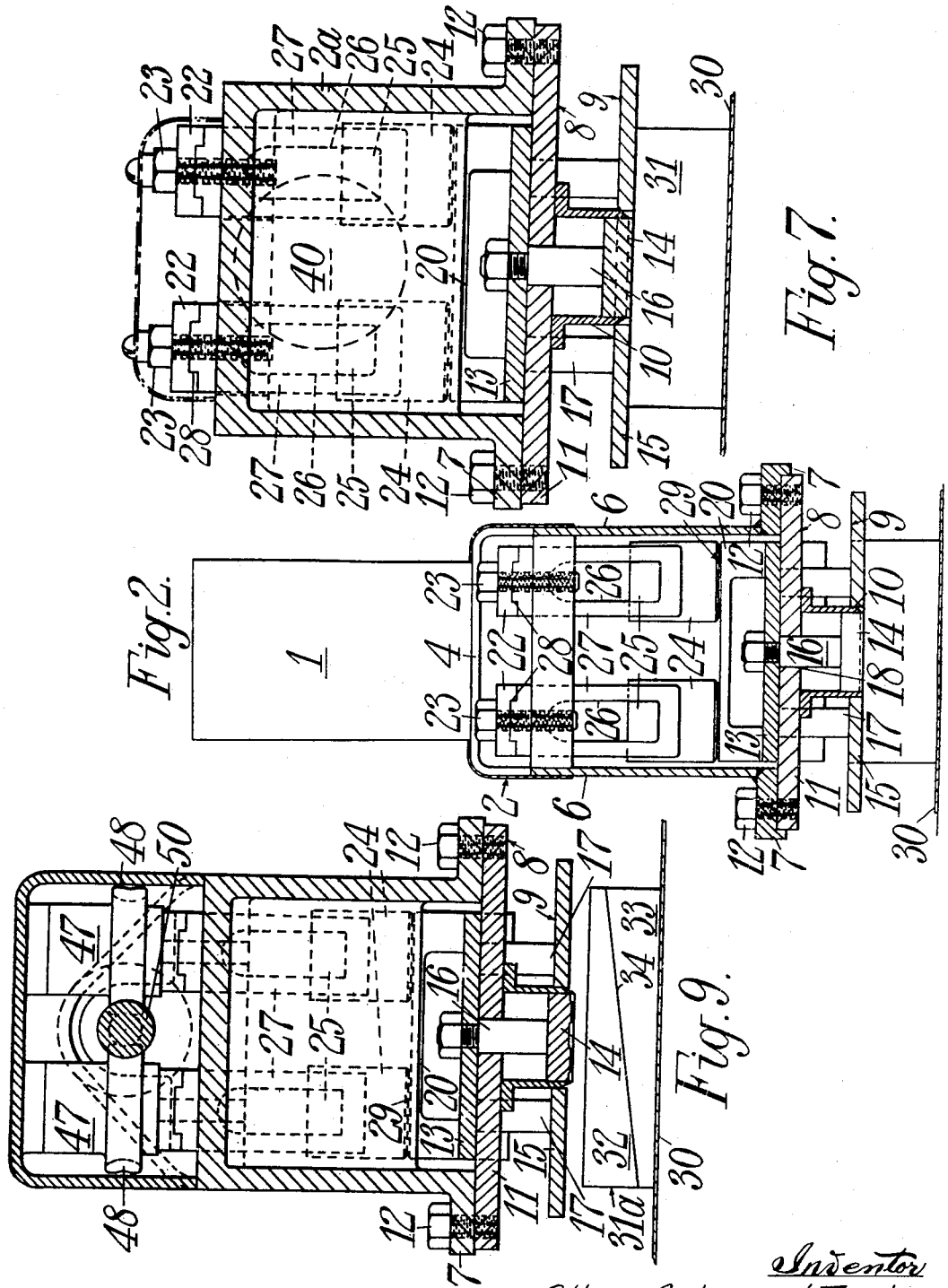

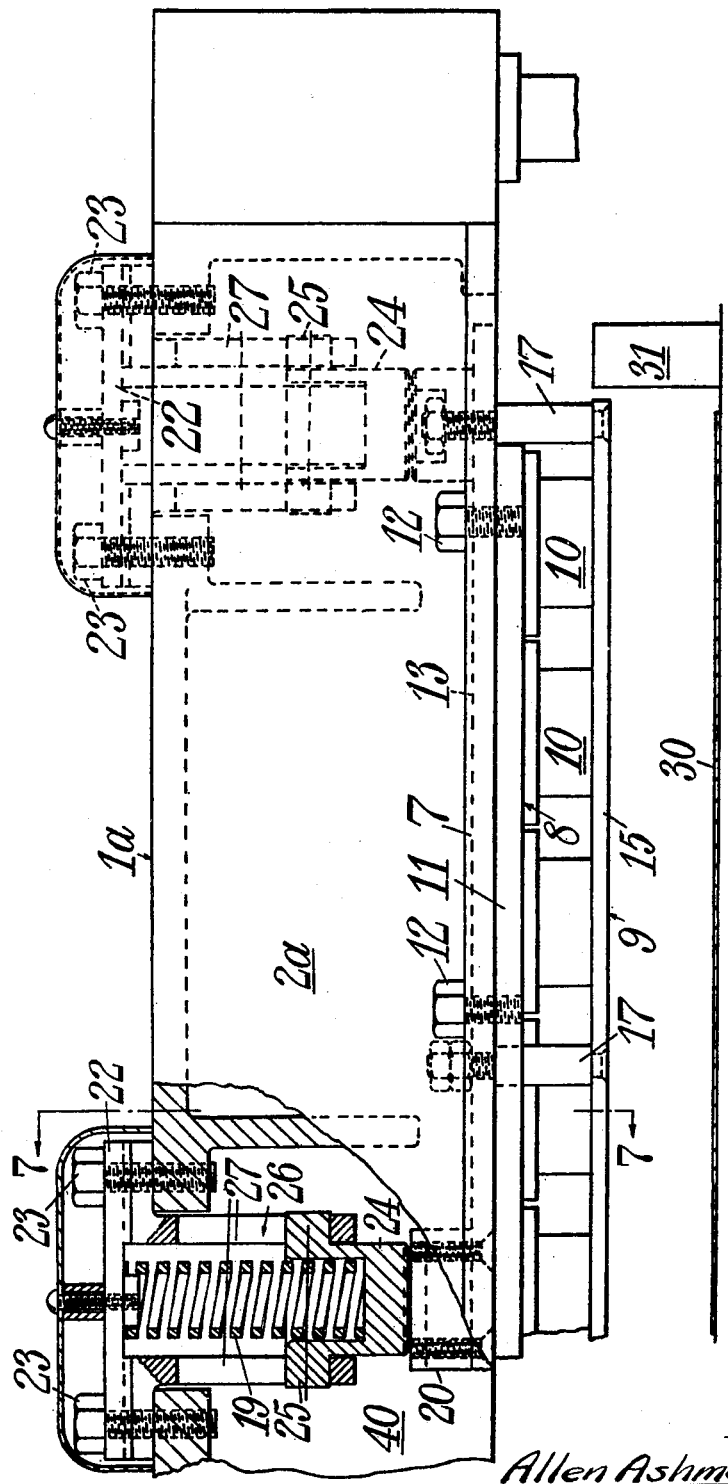

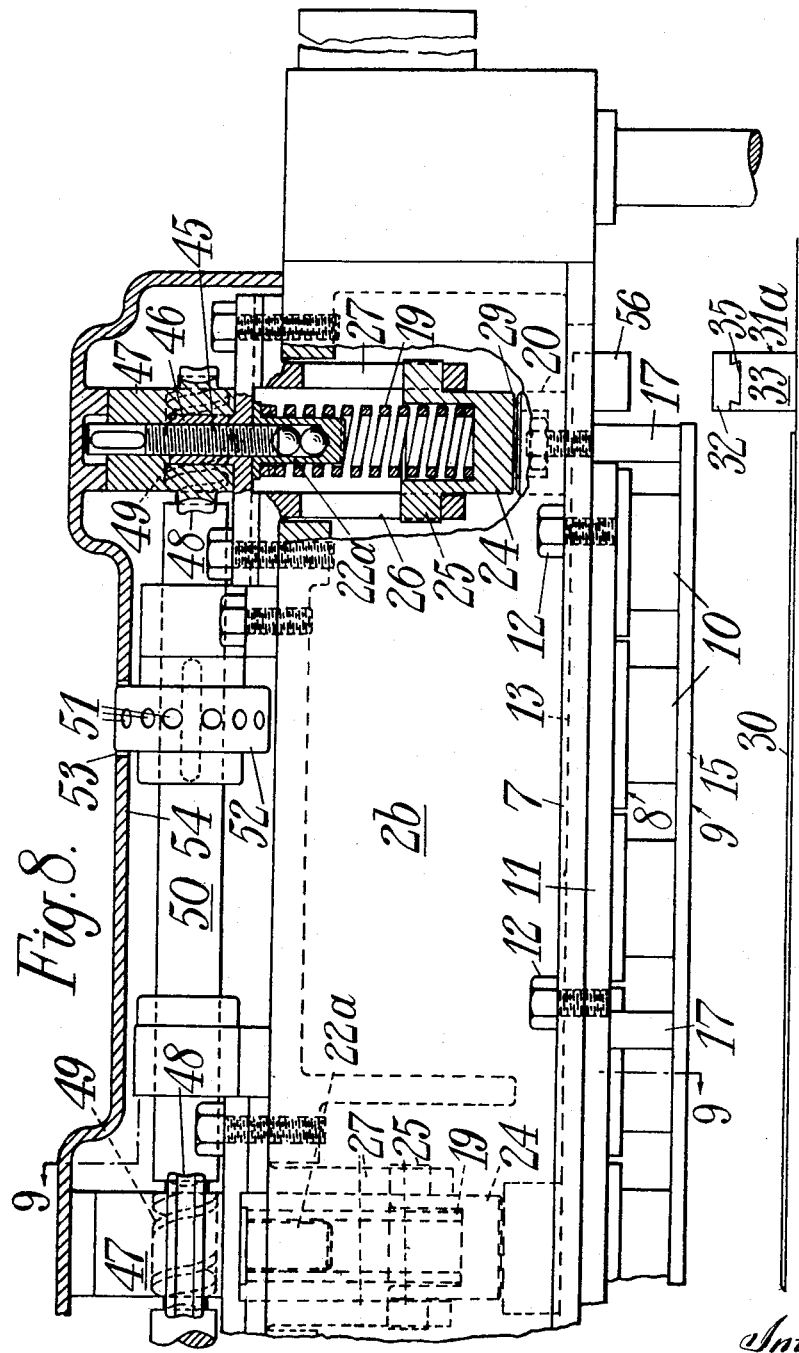

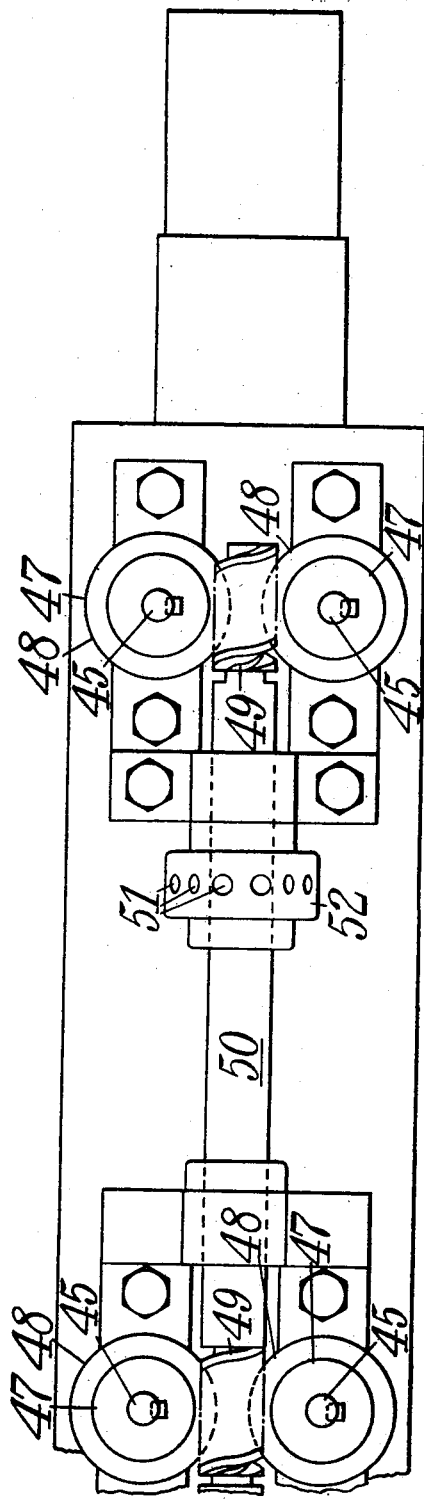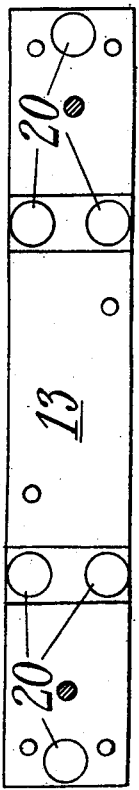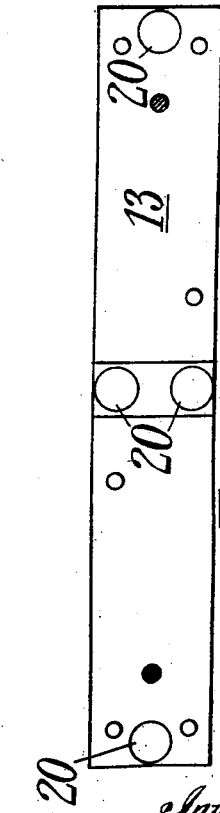

United States Patent Office 2,753,817
Patented July 10, 1956

2,753,817

BISCUIT CUTTING MACHINES AND THE LIKE

Allan Ashmead Tunley, Peterborough, England, assignor to Baker Perkins Incorporated, Saginaw, Mich.

Application January 12, 1953, Serial No. 330,637

Claims priority, application Great Britain January 15, 1952

17 Claims. (Cl. 107—26)

This invention relates to biscuit cutting machinery and the like of the type in which a plurality of cutter members or shells are secured to a cutter bar which reciprocates over a moving sheet of dough to cut biscuits therefrom. Associated with the cutter members on the cutter bar are ejector members located internally of the cutter members to prevent the cut biscuit shapes from rising with the retracting cutters, and a scrap plate, through which the cutter members pass, for preventing the dough scrap outside the cutters from rising as the cutters lift. These inter-related components are of well known form and together with the cutter bar comprise the cutter head of the machine.

The usual arrangement of the cutter head heretofore is that the cutter members are rigidly mounted on a cutter block which is in turn secured to the reciprocating cutter bar, and the ejector members and the scrap plate are assembled in a unitary structure (hereinafter referred to as the ejector assembly) movable with respect to the cutter block and spring loaded against the cutter block so that the ejector members and scrap plate remain held down resiliently during the initial upward movement of the cutter block after cutting has taken place.

Whenever it becomes necessary to change over the machine to the production of a different size or style of biscuit, or whenever repairs or replacements are required, it has been heretofore necessary with cutter heads as described above, to remove and dismantle the cutter block together with its spring means, cutter members, and ejector assembly, all of which as a unitary structure is very heavy and unwieldy.

Furthermore, for replacement of the ejector assembly it is necessary to remove the compression from the spring loading thereon and subsequently to recompress the spring means for the new assembly.

An object of the present invention is to provide an improved cutter head construction in which those parts only which require changing for the production of different shapes and styles of biscuit, viz., the cutter and ejector assembly are demountable as a relatively light and manipulable unit (or units), while leaving the spring loading means for the ejector assembly still under compression in situ on the cutter head.

A further object of the present invention is to provide an improved cutter head construction according to the foregoing paragraph in which the degree of compression applied to the spring means for loading the ejector assembly can be adjusted either when the ejector assembly is in situ or not.

The invention consists in a cutter head construction for a biscuit cutting or like machine comprising a cutter shell assembly and an ejector assembly operatively associated therewith, both assemblies being readily demountable from the cutter block, spring backing means for the ejector assembly permanently secured with respect to the cutter block to be operable on any ejector assembly affixed thereon and means for limiting the downward extension or deflection of such spring means relative to the cutter block at all times whereby the spring means do not effectively bear upon the ejector assembly when the cutter head is in a raised position.

The invention further consists in a cutter head according to the preceding paragraph wherein the spring means are preferably coiled compression springs.

According to one form of the invention the cutter assembly, which also carries the relatively movable ejector assembly, is secured to a hollow supporting box member carried below the cutter bar, the spring means being housed within the box member. In an alternative construction, the cutter bar itself is in the form of a hollow box member to which the cutter assembly is directly secured without an intermediate cutter block or other member.

Further, according to the invention it is preferred to limit the downward extension or deflection of the spring means by providing at the end of the spring means a movable abutment member having projecting lugs which are engaged in slotted means secured to the cutter box or hollow cutter bar, the lugs engaging the ends of the slots to prevent further displacement.

The invention still further consists in a cutter head according to the preceding paragraphs wherein the spring means are adjustable as to strength, as by varying the compression in the case of coiled springs. This may conveniently be achieved by providing adjustably displaceable abutment means, opposite to the movable abutment member; such adjustment may be by the relative rotation of screw threaded means preferably arranged to be turned, for each spring means, by a common actuator.

In the accompanying drawings:

Figure 1 is a partial front elevation of a biscuit cutter head according to the present invention;

Figure 2 is a cross-section of the biscuit cutter head shown in Figure 1;

Figure 3 is an end elevation of the cutter and ejector assemblies demounted from the cutter head;

Figures 4 and 5 are plan views of part of the ejector assemblies showing two dispositions of the backing springs;

Figure 6 is a partial, part-sectional, front elevation of a modified form of biscuit cutter head according to the invention;

Figure 7 is a section on the line 7—7 of Figure 6;

Figure 8 is a partial, part-sectional, front elevation of a further modified form of biscuit cutter head according to the invention;

Figure 9 is a section on the line 9—9 of Figure 8, and

Figure 10 is a plan view of the head shown in Figure 8.

In carrying the invention into effect according to one mode, by way of example, for a cutting machine having an orthodox cutter bar 1, the cutter block as normally used is replaced by a cutter supporting housing or box 2 (hereinafter referred to as the cutter box) comprising a channel-shaped beam 3 secured by its "web" 4 to the cutter bar 1 by bolts 5 in the manner of the normal cutter block. The two depending side walls 6 of the cutter box 2 terminate in outwardly turned flanges 7 on which the cutter and ejector assemblies 8 and 9 are carried as described hereafter.

The cutter shells 10 are secured to a cutter back plate 11 which in turn is secured by releasable means such as bolts 12 to the previously mentioned flanges 7 on the cutter box 2, so that the cutter assembly 8 can be removed from the cutter head without the necessity of removing the cutter box 2.

Directly above the cutter back plate 11 and within the cutter box 2 is located a floating ejector back plate 13 to which the ejectors 14 within the cutter shells 10 and the scrap plate 15 external thereto are secured by studs or posts 16 and 17 passing through apertures 18 in the cutter back plate 11 so that the ejectors 14, scrap plate 15 and ejector back plate 13 are movable as an assembly relative to the cutter shells 10 in known manner. Such an ejector assembly 9 is, however, demountable with the cutter shells 10 on removal of the bolts or other means 12 securing the cutter back plate 11 to the cutter box 2.

As is customary, the required relative movement between the cutter shells 10 and the ejector means 14 is accomplished by providing a spring backing for the ejector assembly. The spring backing means are, however, carried by and secured on the cutter box 2 so that on removal of the cutter and ejector assembly, the spring means are retained on the cutter bar 1 together with the cutter box 2 as will be described.

The spring means comprise a plurality of coiled compression springs 19 located along the length of the cutter head. Four springs may be arranged with one at each end of the cutter head on the longitudinal centre line thereof and two paired on the transverse centre line as shown in Figure 4 by the positioning of bosses 20 described hereafter. Alternatively where six springs are required or more suitable, the end springs may be similarly disposed with the four other springs arranged in pairs equidistantly on either side of the transverse centre line as shown in Figure 5 by the bosses 20.

Each spring 19 is housed within the cutter box 2 passing through an aperture 21 in the upper wall thereof to engage a fixed abutment member 22 secured as by bolts 23 to the cutter box 2. The lower end of each spring 19 enters a cup-like member 24 forming a movable spring abutment adapted to engage the ejector back plate 13 as described hereafter. The abutment cup 24 is provided with a diametrically opposed pair of lugs 25 which are received within the slots 26 of a pair of depending stirrups 27 extending alongside the spring 19. The stirrups 27, by the co-operation of the lugs 25 within the slots 26, serve to limit the downward extension of the springs 19, so that after assembly the springs are retained under a degree of compression whether the cutter-ejector assembly 8 and 9 is in situ or not. Conveniently each stirrup 27 is secured by one of the bolts 23 securing the ejector spring fixed abutment 22, the stirrup 27 having keyed engagement 28 with the latter to maintain alignment.

The above described arrangement, by which the ejector backing springs 19 are retained under compression at all times, allows the cutter-ejector assembly 8, 9 to be changed as required and bolted up to the cutter box 2 without interference from the springs, since the length of the stirrups 27 and dimensions of the moving abutment caps 24 are such that, when the springs 19 are as fully extended as the stirrups 27 permit, the undersides of the moving abutments 24 are spaced by a small clearance from the upper co-operating surfaces 29 of the bosses 20 of ejector back plate 13.

Alternatively to the arrangement providing such clearances, the fully extended limit of the springs 19 may be so set as to cause the abutment caps 24 and the ejector plate 13 to make contact just before the bolts 12 holding the cutter assembly 8 to the cutter box 2 are fully tightened. This eliminates the liability of noise which would be occasioned at each cutting stroke by the closing up of the clearance described above. It is preferred to build up the upper surface of the ejector back plate 13 to provide the previously mentioned raised areas or bosses 20 with which the moving abutments 24 can co-operate.

On the cutting machine, whereon a moving cutting web 30 is provided, passing below the cutter head in known manner, detachable, interchangeable or adjustable stops 31 (Figs. 1, 6, and 7) are provided in the reciprocating path of the cutter head on either side of the cutting web. The adjustable stops which are referred to generally as 31a comprise (Figs. 8 and 9) two wedge blocks 32 and 33 in engagement at their inclined faces so that longitudinal adjustment of one of said blocks adjusts the effective height of the stop. The stops 31a are arranged to be engaged by lugs 56 on the ejector back plate 13 on a downward movement of the cutter head so that the scrap plate 15 and ejector members 14 are arrested so as to be in contact with or rest lightly on the upper surface of the dough sheet on the cutting web. This causes the ejector backing springs 19 to be compressed. Continued downward movement of the cutter head causes the cutter shells 10 to move through the scrap plate 15 and be pressed into the dough sheet to effect cutting. On completion of the downward stroke, the cutter head commences to lift and withdraw the cutter shells 10 from the dough sheet which is held down by the scrap plate 15 and ejector members 14 which are still held against the stops 31 or 31a by the pressure of the springs 19. When the cutter shells 10 have cleared the dough the upper surface of the cutter back plate 11 engages the lower surface of the ejector back plate 13 and the cutter and ejector assemblies 8, 9 cease relative movement and ascend together.

In this position the moving abutments 24 of the springs 19 would be no longer in contact with the rear surface (or bosses 20) of the ejector back plate 13 if the arrangement is such that the previously mentioned clearances are interposed.

For changing cutters, the bolts 12 holding the cutter back plate 11 to the flanges 7 of the cutter box 2 are removed and the cutter and ejector assemblies 8, 9 can be removed as a unit and the new cutter-ejector assembly secured in place without necessitating any adjustment or neutralisation of the backing springs 19. The stops 31 or 31a previously referred to on either side of the cutting web 30 can be changed or adjusted as required for the new cutter assembly.

According to a further form of the invention, the cutter supporting housing or box 2 previously described may be dispensed with, or rather combined with the cutter block 1 which is consequently modified. This arrangement, see Figures 6 and 7, results in an entirely modified form of cutter head 1a which is of decreased vertical height and weight compared with orthodox cutter heads and that previously described above. In this modified form, the combined cutter bar and support housing comprises a channel shaped beam 2a mounted in guides for reciprocatory movement and to which the reciprocating drive is directly applied.

The cutter shell and ejector assemblies 8, 9 are the same as described above and are secured as before by bolts 12 to outwardly extending flanges 7 on the lower edges of the channel-shaped cutter bar beam 2a. The spring backing means 19 for the ejector assembly 9 may also conveniently be the same as before, but are accommodated within the cavity 40 of the cutter bar beam 2a to which they are secured as previously described with reference to the intermediate cutter box 2 of Figures 1 to 3. The operation of the device and changing of the cutter-ejector assemblies are the same as before.

For certain purposes it may be necessary or desirable to be able to alter the compression (and therefore the effective strength) of the backing springs 19. To this end therefore the backing spring mounting may be modified (see Figures 8, 9 and 10) by the provision of means operable to compress the springs from their upper end while maintaining the previously described arrangement of movable lower abutments 24 and retaining stirrups 27. It is also preferable to effect such adjustment simultaneously and equally to each of the springs. Thus the upper "fixed" abutment 22a of each spring 19 may be displaceable downwards, for adjustment purposes, by a threaded post 45 engaged in a threaded sleeve 46 fixed to the cutter bar or box 2b so that rotation of the post 45 causes it to move up or down the sleeve 46. Slidably secured to the post 45 is a surrounding collar 47 provided with external pinion teeth 48 adapted to be engaged by a worm wheel 49 rotatable by an actuating shaft 50, so that rotation of the shaft 50 causes rotation of the collar 47 and post 45 and consequent movement of the upper abutment 22a. The actuating shaft 50 is arranged to have worm drive to all the backing spring adjustment means so that all springs may be adjusted equally and simultaneously. Rotation of the shaft 50 for adjustment purposes is conveniently obtained by the insertion of a tommy bar into apertures 51 in a setting collar 52 secured on the shaft. A window 53 is cut in the cover 54 which protects the mechanism.

Where owing to adjustment of the backing spring pressures, and due to changes in cutter-ejector assemblies, it is necessary to alter the height of the previously mentioned stops 31 on each side of the cutting web 30, it is preferred according to the invention to provide an adjustable stop 31a comprising two inter-acting portions 32 and 33 in the form of two co-operating ramps or wedges, which are in engagement at their inclined faces 34. Relative movement of the ramps or wedges along their line of inclination thus alters the effective height of the stop. In order to prevent displacement of the two portions the inclined surfaces may have a dove-tail key and keyway 35 to provide for interlocking.

I claim:

1. In a biscuit cutting or like machine, reciprocable support means movable toward and away from a dough sheet, a relatively movable cutter carrying member and ejector assembly detachably mounted as a unit on said support means over said dough sheet, means preventing further movement of the ejector assembly when the latter is brought into engagement with said dough sheet as the support means is moved toward the sheet, cutters on said cutter carrying member moving into said sheet on further movement of said support means toward said sheet, and means capable of applying a load to said ejector assembly normally held out of bearing engagement with said unit when the cutters are out of engagement with the dough sheet and energized by said further movement of said support means to bear against said ejector assembly and hold the same in engagement with the sheet and the sheet stationary until the cutters are clear of the sheet when the support means is retracted.

2. In a biscuit cutting or like machine for cutting into a dough sheet, support means including a cutter carrying member, a dough ejector assembly detachably supported thereby, said cutter carrying member being mounted on the support means and the ejector assembly being mounted in a manner to permit relative movement of said support means and ejector assembly, spring means under load and capable of applying a force to said ejector assembly energized by relative movement of said support means and ejector assembly during the cutting stroke to bear against said ejector assembly and assist relative movement of said members during the withdrawal stroke, and means holding said spring means normally out of bearing engagement with said ejector assembly to permit its detachment without affecting the load on said spring means.

3. In a biscuit cutting or like machine, a cross head including a cutter carrying member, a dough ejector assembly detachably supported by said cross head in juxtaposition with said cutter carrying member, said cutter carrying member being fixed to the cross head and the assembly being supported to permit relative movement of said cross head and ejector assembly, and spring means supported between said ejector assembly and cross head engageable with said ejector assembly to be energized by relative movement of said cutter carrying member and ejector assembly during the cutting operation and to bear on said ejector assembly and thereby assist relative movement of said members during the withdrawal operation, and means fixed on said cross head holding said spring means out of bearing engagement with said ejector assembly so that said cutter carrying member and ejector assembly can be detached independently of said spring means without affecting the load thereon.

4. In a biscuit cutting or like machine, a cutter carrying member and a dough ejector assembly, support means for detachably supporting said cutter carrying member and dough ejector assembly over a sheet to be cut, said cutter carrying member being removably fixed to said support means in a manner to be movable therewith, said ejector assembly being removably supported to permit relative movement with said support means, preloaded spring means between said support means and ejector assembly and engageable with the latter to be compressed by relative movement of said support means and ejector assembly during the cutting stroke of the cutter carrying member so as to hold said ejector assembly in engagement with the sheet when the cutter carrying member is withdrawn and prevent the sheet from moving therewith, and means supporting said spring means out of bearing engagement with the ejector assembly except during the cutting and withdrawal strokes so that said cutter carrying member and ejector assembly can be detached independently of said spring means without affecting the preloaded condition thereof.

5. In a biscuit cutting or like machine, reciprocable support means extending over a dough sheet to be cut, a cutter carrying member detachably fixed to said support means over said sheet and movable with said support means, cutters thereon, a dough ejector assembly for preventing movement of the dough sheet with the cutters when the latter are withdrawn carried by said support means, said ejector assembly being supported by said cutter carrying member to permit movement of said cutter carrying member relative thereto, means arresting further movement of said ejector assembly when the latter is brought into engagement with said sheet upon actuation of said support means in the cutting stroke, and spring means under compression supported between said support means and ejector assembly further compressed by movement of said support means toward the ejector assembly to force the cutters into the sheet, said spring means serving to maintain the ejector means in engagement with the sheet when the support means moves in the opposite direction to withdraw the cutters, and means fixed on said support means normally carrying said spring means and holding it out of bearing engagement with said ejector assembly normally until the ejector assembly engages the dough sheet so that said cutter carrying member and ejector assembly can be changed independently thereof without affecting the normal load thereon.

6. In a biscuit cutting or like machine, reciprocable support means movable toward and away from a dough sheet, a cutter carrying member detachably mounted on said support means and movable therewith, cutters thereon, an ejector assembly for preventing movement of the dough sheet with the cutters when the latter are withdrawn from the sheet, said ejector assembly being carried by the cutter carrying member in a manner to permit relative movement of the latter, means for preventing further movement of the ejector assembly when the latter is brought into engagement with the dough sheet during travel of the support means toward the sheet, preloaded, helical spring means supported between said support means and ejector assembly and engageable with the latter to be compressed during the cutting stroke so as to retain the ejector assembly in engagement with the sheet during retraction of the support means and cutters, and guide means on said support means normally holding said spring means in compression out of bearing engagement with said ejector assembly.

7. The combination defined in claim 6 in which screw members are disposed in axial alignment with said spring means, said screw members being rotatably mounted but axially immobile, axially movable blocks on said screw members in engagement with said spring means to compress or permit expansion of the same, and means for actuating said screw members to adjust the load on said springs.

8. The combination defined in claim 6 in which said means for arresting the movement of the ejector assembly comprises superposed wedge members relatively adjustable longitudinally to vary the effective height thereof.

9. In a biscuit cutting machine, a reciprocable cross head movable toward and away from a dough sheet, a relatively movable cutter carrying member and ejector assembly detachably carried as a unit on said cross head, stirrup means including slots of predetermined length fixed on said cross head, stops for preventing further movement of the ejector assembly when the latter is brought into engagement with the dough sheet during the travel of the cross head toward the sheet, cutters on said cutter carrying member moving into said sheet on further movement of said cross head toward the sheet, preloaded spring means extending from said cross head toward said ejector assembly so as to be compressed during movement of said cutters into the sheet and capable of holding said ejector assembly against the sheet to prevent movement thereof when the cutters are retracted during the return stroke of said cross head, and lugs associated with said spring means riding in said slots and bearing on said stirrup means to maintain the spring means in preloaded condition out of engagement with said unit.

10. The combination defined in claim 9 in which cups are provided on the ends of said spring means adjacent the ejector assembly, and bosses on said ejector assembly are normally out of engagement therewith.

11. The combination defined in claim 9 in which means are provided on said cross head for adjusting the preloading of said spring means.

12. The combination defined in claim 9 in which said cross head includes a cutter box depending therefrom and said stirrup means and spring means are housed therein.

13. The combination defined in claim 9 in which blocks are associated with said spring means which are adjustable to increase the load on said springs.

14. In a biscuit cutting machine, a vertically reciprocable cross head, a dough sheet supported thereunder, a relatively movable cutter carrying member and ejector assembly detachably carried as a unit on said cross head, support blocks fixed within said cross head at longitudinal intervals over the length thereof, coil springs depending from said blocks, stirrup members including slots of predetermined length depending from said cross head on opposite sides of each spring, cup members for the lower end of each spring including lugs extending laterally therefrom into the slots in said stirrups, stop means for preventing further movement of the ejector assembly when the latter is brought into engagement with the dough sheet during the travel of the cross head toward the sheet, cutters on said cutter carrying member moving into said sheet on further movement of said cross head toward the sheet, and bosses on said ejector assembly normally just out of bearing engagement with said cup members which serve to compress said springs during movement of said cutters into the sheet so that the ejector assembly is held against the sheet during retraction thereof.

15. The combination defined in claim 14 in which said stirrups have keyed engagement with said blocks to maintain alignment thereof.

16. The combination defined in claim 14 in which said springs when as fully extended as permitted by said stirrups are in a state of compression.

17. In a biscuit cutting machine for cutting into a dough sheet wherein there is relative movement of elements of the machine and the dough sheet in a cutting and withdrawal stroke, support means, including a cutter carrying member, having relative movement with respect to the dough sheet in a cutting stroke and a withdrawal stroke, a dough ejector assembly detachably supported by said support means, said cutter carrying member being mounted on the support means and the ejector assembly being carried so as to permit relative movement of said support means and ejector assembly, means preventing further movement of the ejector assembly when the latter comes into engagement with the dough sheet during the forepart of the cutting stroke, cutters on said cutter carrying member for cutting into the sheet during the remainder of the cutting stroke, means capable of applying a load during a portion of the withdrawal stroke bearing against said ejector assembly as the cutters are separated from the dough sheet to prevent concurrent movement of said cutter carrying member and dough ejector assembly, and means normally preventing said last mentioned means from applying a load to said ejector assembly when the cutters are out of engagement with the dough sheet to permit detachment of the ejector assembly without affecting the said last mentioned means.

References Cited in the file of this patent

UNITED STATES PATENTS

| 1,960,416 | Monks | May 29, 1934 |

FOREIGN PATENTS

| 182,659 | Great Britain | July 13, 1922 |